May 31, 1960 E. BELLMANN 2,938,699
PROP-TYPE SUPPORTING DEVICES
Filed Jan. 4, 1954 2 Sheets-Sheet 1

INVENTOR
EUGEN BELLMANN,
BY
ATTORNEY

May 31, 1960 E. BELLMANN 2,938,699
PROP-TYPE SUPPORTING DEVICES
Filed Jan. 4, 1954 2 Sheets-Sheet 2

INVENTOR
EUGEN BELLMANN,
BY
ATTORNEY

United States Patent Office 2,938,699
Patented May 31, 1960

2,938,699
PROP-TYPE SUPPORTING DEVICES

Eugen Bellmann, 6a Hammerstrasse, Hagen-Haspe, Germany; Emma Elfriede Bellmann, née Vogelsang, Ruth Kronsbein, née Bellmann, and Friedhelm Bellmann, legal representatives of said Eugen Bellmann, deceased Filed Jan. 4, 1954, Ser. No. 401,941

Claims priority, application Germany Jan. 15, 1953

7 Claims. (Cl. 248—354)

This invention relates to prop-type supporting devices, and more particularly to shoring supports as used in the operation of mines.

One object of the invention is to provide a new and improved method for inserting prop-type supporting devices between the hanging wall and the floor of a lode.

Another object of the invention is to provide a prop-type supporting device for mine service which is free from any initial incremental sag upon being placed in position and which does not call for any more or less complicated adjustments or operations for precluding such sag.

A further object of the invention is to provide a jack-type support applicable for mine service wherein the load-lifting element is being automatically locked in position by a component derived from the force of reaction opposing the load-lifting force, whereby the time normally required for setting up a support is considerably reduced.

Another object of the invention is to provide a prop-type supporting device or shoring-support wherein the supporting column is adapted to be telescoped by a fluid under pressure and automatically locked in position by the action of said fluid under pressure upon having been extended the required length.

Still another object of the invention is to provide a prop-type telescoping supporting device permitting instant withdrawal of the device when not needed any longer as a support at the point where originally installed.

Other objects and advantages of the invention will become apparent as the description thereof proceeds.

The method according to this invention of installing supporting devices comprising a pair of coaxially arranged telescoping supporting columns includes the steps of applying a lifting force to said pair of columns tending to effect relative movement thereof in longitudinal direction, of deriving a transverse component from the force of reaction opposing said lifting force upon initial relative longitudinal movement of said pair of columns, and of applying said component to exert transverse clamping pressure tending to preclude further relative movement of said pair of columns.

The drawing illustrates several supporting devices designed to operate in accordance with the above method or principle of operation.

Figure 1:
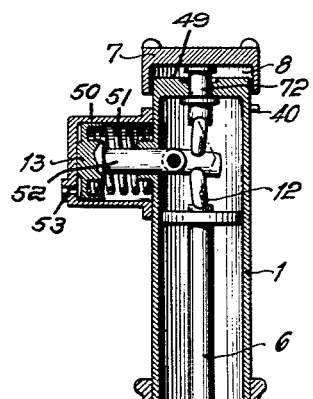
Fig. 1 is generally a longitudinal section along a supporting device embodying the present invention, some of the parts of the device being shown in front elevation rather than in longitudinal section.

Referring now to Fig. 1, reference numerals 1 and 2 indicate a pair of coaxially arranged supporting columns. The upper column 1 is inserted into the lower column 2 and slidably arranged therein in a direction longitudinally of both columns 1 and 2. The lower end of column 1 is closed by a piston structure 45 to enable column 1 to be moved within column 2 under the action of fluid under pressure introduced into column 2 in the fashion of the piston of a fluid motor. A cup-gasket or sleeve 9 is attached to piston structure 45 to preclude fluid under pressure from escaping from the space in front of piston structure 45 to the back thereof. Column 2 is provided with an orifice 10 for the admission of a fluid under pressure. Either a liquid under pressure or a gas under pressure may be used to operate the device. In other words, the device may be operated hydraulicallly, if desired, or pneumatically, if the latter mode of operation appears to be more appropriate or desirable under the circumstances. Structure 45 supports a radially outer wedge member 4 which is generally in the shape of a tapered sleeve defining a hollow cone. The radially inner wedge member 3 is in the shape of a solid truncated cone arranged within, and coaxially with respect to, wedge member 4. A plurality of friction-reducing balls 5 are arranged between wedge members 3 and 4. Wedge member 3 has a projection 46 surrounded by a helical spring 47 resting against piston structure 45 and biasing wedge member 3 in upward direction. Column 1 is provided adjacent the lower end thereof with lateral or radial slots 48, imparting increase transverse resiliency to the slotted portion of column 1. Wedge member 4—which is made up of a plurality of separate sections—is adapted to engage the area of column 1 where the latter is laterally slotted. If this engagement is effected under sufficient pressure the slotted portion of column 1 is bent radially outwardly into firm engagement with the inner surface of column 2, and further relative movement of columns 1 and 2 in a direction longitudinally thereof is then precluded. Thus wedge members 3 and 4 and the parts associated with them may be caused to operate as an effective friction brake for holding column 1 in any desired position against the action of considerable external forces. Rod 6 which is a force-transmitting means is arranged coaxially with respect to conical wedge member 3 and consists of two parts of which the lower part is integrated with wedge member 3 into a structural unit. The upper part of rod 6 is slidably arranged in disc flange 72. A toggle mechanism 12 is arranged between the adjacent yet spaced ends of rod 6. Toggle mechanism 12 is normally overdrawn and then forms a rigid interconnection or coupling between the lower portion and the upper portion of rod 6. Toggle mechanism 12 can be collapsed, if desired, by means of a fluid motor comprising the piston 13 and the cylinder 50 which is secured to the side of column 1. Piston 13 is biased by spring 51 to the left, tending to hold toggle 12 in overdrawn position by means of link 52. Cylinder 50 is provided with an orifice 53 for the admission of fluid under pressure. Upon admission of fluid under pressure to piston 13, the latter and link 52 are jointly moved against the bias of spring 51 from left to right, thus causing collapse of toggle 12 and uncoupling of the lower portion of rod 6 from the upper portion thereof. The upper portion of rod 6 supports a cap-shaped end member 7 adapted to receive the top end 49 of column 1. Prior to installation of the supporting device there is a predetermined clearance 8 between the top end 49 of column 1 and the inner surface of cap-shaped end member 7. A pin 40 arranged on column 1 immediately adjacent to cap-shaped end member 7 indicates the amount of the upward travel of column 1 relative to cap-shaped end member 7.

To operate the supporting device shown in Fig. 1 the two columns 1, 2 are held in vertical position while fluid under pressure is being admitted to orifice 10 acting upon piston structure 45 and raising column 1. This causes the upper surface of cap-shaped end member 7 to engage the ceiling or equivalent structure to be supported by the supporting device. Continued action of fluid pressure upon piston structure 45 causes upward movement of column 1 and compression of helical spring 47. Simultaneously radially inner wedge member 3 is wedged into the radially outer wedge member by the action of the force of reaction to the force acting upon piston structure 45. Said force of reaction is being transmitted to wedge member 3 through end member 7, the upper and the lower portion of rod 6 and through toggle coupling 12. The force transmitted to wedge member 4 through rod 6 is equal, but opposite, to the force which the fluid in front of piston structure 45 exerts upon said piston structure. The transverse clamping pressure between the radially outer wedge member 4 and the inner surface of column 1 increases as the driving force force upon piston structure 45 increases and as the clearance 8 between parts 7 and 49 decreases. When this clearance is about to become zero sufficient transversal pressure may be exerted by part 4 upon the inside of column 2 to frictionally maintain columns 1 and 2 in position against the action of the weight resting upon the top end of the supporting device. As an alternative, the transverse clamping pressure may be insufficient to preclude relative movement of columns 1 and 2 against the action of the weight resting upon the top end of the supporting device when clearance 8 is about to become zero. In this instance continued increase of the fluid pressure acting upon piston structure 45 will increase the force tending to ram member 3 into member 4 and to increase the pressure between parts 4 and 1 and the frictional engagement between the latter and the inner surface of column 2.

It will be apparent from the foregoing that a joint fluid motor is being provided in the structure shown in Fig. 1 for raising column 1 and for operating the brake mechanism precluding relative movement of columns 1 and 2 in a direction longitudinally thereof.

Admission of fluid under pressure to orifice 53 of the fluid motor 13, 50 results in instant collapse of toggle 12 under the action of the load resting upon end member 7 and movement of end member 7 in downward direction along the outer surface of column 1, thus enabling instant removal of the supporting device from the place where it has been used heretofore.

Figure 1B:
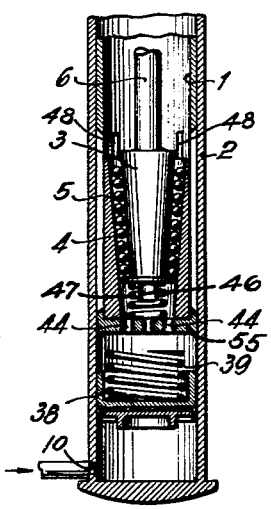
Fig. 1b is a sectional view similar to that shown in Fig. 1 illustrating a modification of the lower end of the supporting device.
Figure 1A:
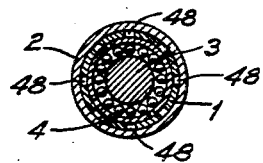
Fig. 1a is a section along 1a—1a of Fig. 1.

The modification shown in Fig. 1b differs from the embodiment of the invention shown in Fig. 1 in regard to the mode of operation of column 1. According to Fig. 1a the lower end of column 1 is closed by a plate 55 having perforations 44. The inside of column 2 houses a piston 38, a helical spring 39 being arranged between perforated plate 55 and piston 38.

Upon admission of fluid under pressure through orifice 10 into column 2 piston 38 is moved upwardly and spring 39 is simultaneously compressed, resulting in an upward movement of column 1 relative to column 2 and in compression of spring 47 upon engagement of a ceiling to be supported by end member 7. As a result member 4 is expanded radially outwardly, thus providing some support for column 1. Thereafter the supply of compressed air or other fluid under pressure is cut off from orifice 10 in column 2, thus permitting piston 38 to reset under the action of spring 39. Upon resetting of piston 38 orifice 10 is periodically connected to a supply of fluid under pressure and disconnected from the supply. As a result, piston 38 is periodically being thrown with a considerable impact against plate 55, which causes column 1 to be lifted relative to column 2 in a series of successive steps and causes progressive tightening of the brake or clamping mechanism of the supporting device at each successive step.

Figure 2:
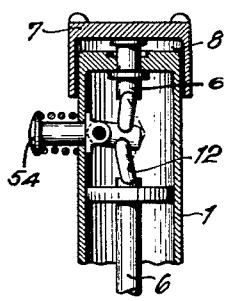
Fig. 2 is a sectional view similar to that shown in Fig. 1 illustrating a modification of the upper or top end of the supporting device.

The structure shown in Fig. 2 differs from that shown in Fig. 1 only inasmuch as the fluid motor of the piston and cylinder type for collapsing toggle 12 has been omitted. Instead an actuating head 54 for toggle 12 has been provided which permits by application of a sufficient force upon it to collapse toggle 12 at will.

Figure 3:
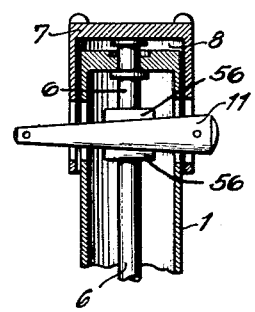
Fig. 3 is a sectional view similar to that shown in Fig. 2 illustrating another modification of the upper or top end of the supporting device.

The structure shown in Fig. 3 may be used instead of, or as a substitute for, the toggle mechanism 12 shown in Figs. 1 and 2. According to Fig. 3 rod 6 is provided with a pair of spaced elements 56 having a pair of juxtaposed converging surfaces. A wedge 11 is driven between the converging surfaces of elements 56, thus providing a positive coupling between the upper portion and the lower portion of rod 6. Removal of wedge 11 from the place it normally occupies permits downward movement of end member 7 relative to columns 1 and 2 and consequent removal of the supporting device from the location where it had originally been used.

Figure 4:
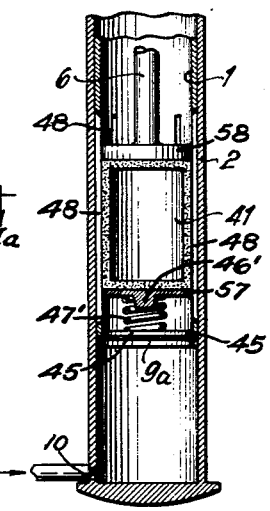
Fig. 4 is a sectional view similar to that shown in Fig. 1a illustrating another modification of the lower end of the supporting device.

The structure shown in Fig. 4 differs from that shown in Fig. 1 inasmuch as in the former a pneumatic brake or clamping mechanism has been substituted for the mechanical brake or clamping mechanism shown in Fig. 1. According to Fig. 4 a fluid-filled bladder 41 made of rubber or of another material having properties similar to rubber is arranged between a pair of plates 57 and 58. Plate 57 is arranged above piston structure 45 and has a projection 46' centering helical spring 47' resting against piston structure 45. The upper plate 58 forms an integral part of the lower portion of abutment rod 6.

Upon admission of fluid under pressure to orifice 10 in column 2, column 1 is raised and bladder 41 is axially compressed between plates 57 and 58. This results in a radial or tranverse expansion of bladder 41 which then frictionally engages the inner surface of column 1 at the portion thereof where slots 48 are provided in column 1. Thus column 1 is being clamped in position, precluding any further relative movements of columns 1 and 2 in a direction longitudinally thereof.

Figure 5:
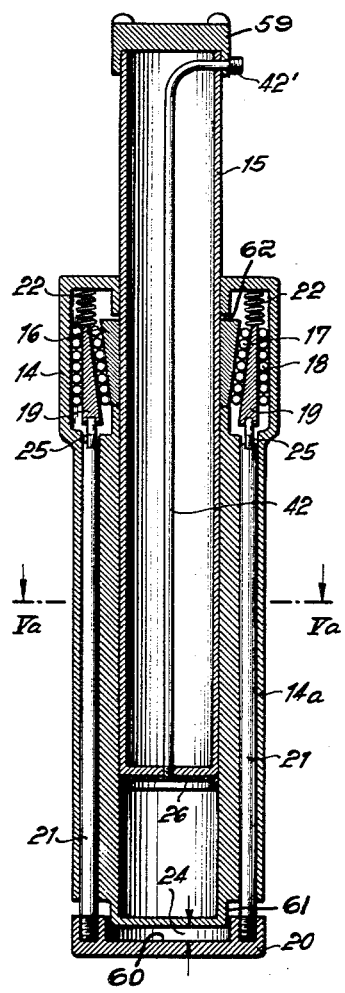
Fig. 5 is a sectional view similar to that of Fig. 1 of another supporting device embodying the invention.
Figure 5A:
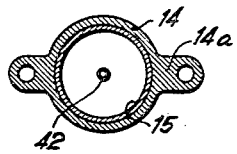
Fig. 5a is a cross-section along Va—Va of Fig. 5.

Referring now to Figs. 5 and 5a, numeral 14 has been applied to a radially outer column of relatively large diameter and numeral 15 has been applied to a radially inner column having a relatively small diameter. Both columns 14, 15 are arranged coaxially and column 15 is slidably fitted into column 14. Closing element 59 of column 15 is intended to engage a ceiling structure requiring support, as, for instance, the hanging wall structure of a mine. The lower end of column 15 is closed by a transverse partition 26 on which a cup-shaped gasket is being mounted. Partition 26 constitutes column 15 a piston movably arranged within column 14. These two parts cooperate in the fashion of the piston and cylinder of a fluid motor. The upper end of column 15 is provided with an orifice 42' permitting admission of fluid under pressure to pipe 42 from where it is conducted to the space in column 14 below partition 26. Column 14 is provided with a pair of lateral extensions 14a adapted to receive a pair of rods 21. The lower ends of rods 21 are fixed in space, i.e. screwed into and supported by an end member 20. End member 20 is provided with a recess 60 into which the lower end of column 14 may enter. To this end the lower end of column 14 has a shoulder portion 61 having the same shape as recess 60. Normally, i.e. before the support is being installed there is a predetermined clearance 24 between column 14 and end member 20. The upper portion of column 14 defines a chamber for accommodating a brake mechanism or clamping mechanism comprising the two wedge members 16 and 19. The radially outer wedge member 19 is acted upon by helical springs 22 of which the upper ends rest against column 14 and of which the lower ends rest against the radially outer wedge member 19. The radially outer wedge member 19 and the abutment rods 21 are mechanically coupled by means of a pair of wedges 25 having the same shape and the same function as wedge 11 shown in Fig. 3. The radially inner wedge member 16 is split and arranged within an annular opening 62 of column 14 and engages with the inner surface thereof slidably the radially outer surface of column 15. A plurality of antifriction rollers 17 are arranged in the gap formed between wedge members 16 and 17. In a similar fashion a plurality of anti-friction rollers 18 are arranged in the gap formed between the radially outer wedge member 19 and the inner surface of the upper portion of column 14.

Upon admission of fluid under pressure through orifice 42' and pipe line 42 to the space below partition 26, column 2 is being lifted by the action of the fluid under pressure until abutment element 59 is being stopped by abutting against a beam to be supported, or the like. The action of fluid under pressure upon the inner bottom surface of column 14 results in downward movement of column 14 against the bias of springs 22. As a result of the joint downward movement of column 14 and of the radially inner wedge member 16, i.e. as a result of the relative movement of wedge members 16 and 19 in a direction longitudinally of columns 14 and 15, the split radially inner wedge member 16 is being clamped against the outer surface of the radially inner column 15, thus causing the latter to be arrested and precluding the latter from moving relative to column 14. The supporting device may be readily removed from the place where it has been originally installed upon removal of the two wedges 25, which permits radially outer movement of wedge member 16 and causes a collapse of the transverse clamping pressure previously exerted by wedge member 16.

Figure 6:
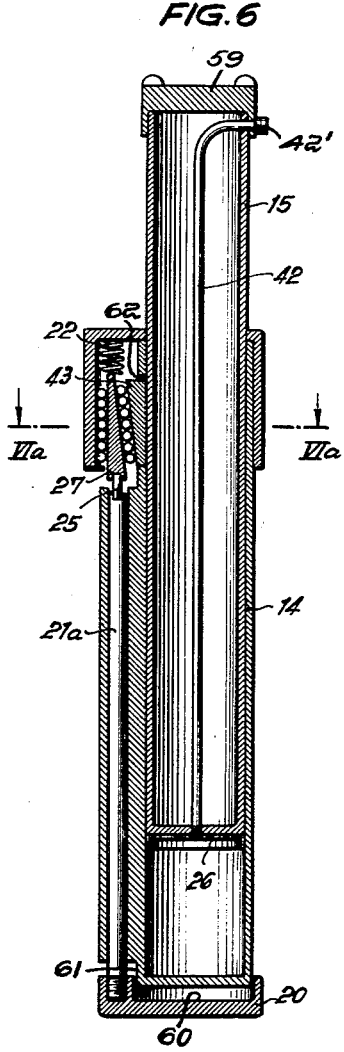
Fig. 6 is a sectional view similar to that of Fig. 1 of still another supporting device embodying the present invention.
Figure 6A:
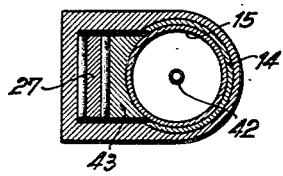
Fig. 6a is a section along VIa—VIa of Fig. 6.

Figs. 6 and 6a show a structure which is in essence the same as that shown in Figs. 5 and 5a, except for the fact that the wedge members 16 and 19 provided in the structure of Figs. 5 and 5a have been substituted by a pair of one sided wedge members 43 and 27 in the structure of Figs. 6 and 6a. Wedge member 27 is acted upon by helical spring 22. Wedge member 27 rests upon a wedge 25 which, in turn, is supported by rod 21a. The latter is secured to end member 20 spaced from column 14 and having a recess 60 adapted to receive the lower end of column 14. Wedge member 43 has a semi-cylindrical surface engaging the outer surface of column 15. Antifriction rollers may be provided between parts 43 and 27 and 27 and 14 to minimize friction.

Upon admission of fluid under pressure through orifice 42' and pipe 42 into column 14, column 15 is being raised and column 14 lowered under the action of the pressure exerted upon these two parts. Lowering of column 14 results in lowering of wedge member 43, i.e. in a relative movement of wedge members 27 and 43 in a direction longitudinally of columns 14 and 15. Consequently a pressure directed from left to right, as seen in Fig. 6, is exerted by wedge member 27 upon wedge member 43 and by the cylindrical surface of the latter (see Fig. 6a) upon the outer surface of column 15. This pressure maintains columns 14 and 15 in position until such time as the coupling between wedge member 27 and abutment rod 21a is being removed by removal of wedge 25.

It will be apparent from the foregoing that all embodiments of the invention illustrated and described comprise an end member arranged outside of one of the two columns adjacent the axially outer end of said one column in spaced relation therefrom and movable relative thereto. In the embodiments of the invention shown in Figs. 1, 2 and 3 the aforementioned end member is formed by a cap 7 intended to engage a ceiling to be supported, whereas in the embodiments of the invention shown in Figs. 5, 5a, 6 and 6a the aforementioned end member is formed by a cap 22 associated with the lower end of lower column 14.

It will also be apparent from the foregoing that all embodiments of the invention illustrated and described comprise force-transmitting means for transmitting the opposite pressures exerted upon the axially outer ends of the supporting device, i.e. the axially outer end of one of the columns and the end member associated with the axially outer end of the other of the columns, to the wedge action means thereof. In the embodiments of the invention shown in Figs. 1, 2 and 3 the aforementioned force-transmitting structure comprises parts 6 and 12, whereas in the embodiments of the invention shown in Figs. 5, 5a, 6 and 6a the force-transmitting structure comprises parts 21 and 25, and 21a and 25a, respectively.

All brake mechanisms for precluding relative movement between the two telescoping columns shown are provided with brake surfaces movable in a direction transversely to the axis of the two columns. The wedge elements 3, 4 of Figs. 1 and 1a, or the wedge elements 16 and 19 of Figs. 5 and 5a, or the wedge elements 27, 43 of Figs. 6 and 6a preclude relative movement between the two telescoping columns after the pressure of the column-operating fluid motor has ceased to act.

In all embodiments of the invention the force-transmitting structure comprises collapsible brake-releasing means. In the embodiments of the invention shown in Figs. 1 and 2 the collapsible brake-releasing means is formed by toggles 12 and the operating mechanisms associated with toggles 12. In the embodiment of the invention shown in Fig. 3 the collapsible brake-releasing means is formed by parts 11 and 56, and in the embodiments of the invention shown in Figs. 5, 5a, 6 and 6a the collapsible brake-releasing means is formed by wedges 25.

It will be noted that the wedge action means, such as the parts 3, 4 in the structure of Fig. 1, is arranged outside of the space of the column-operating fluid motor which receives the operating fluid. In other words, the wedge action means is arranged outside of the operating cylinder of the column operating fluid motor. Since the wedge action means remains in locked position, or braking position, once locked, the continued action of the fluid motor is not required to maintain the prop or column locked in its weight supporting position. The main difference between the structures of Figs. 1 and 5 consists in that in the former the wedge elements 3, 4 are arranged inside the inner column 1, whereas in the latter the wedge action elements 16, 19 act upon the outer surface of the inner column 15.

The supporting columns may be reversed in use or turned upside-down i.e., the part thereof shown to be the bottom part may serve as the top part, and vice versa. It is even desirable to use the structure of Fig. 1 upside down because this precludes grime and dirt which may drop down from the supported ceiling structure to enter the small gap formed between the inner column 1 and the outer column 2. Turning the structure upside-down raises the level of the orifice at which fluid under pressure is being introduced into the supporting device. This is desirable because overhead pipelines are less likely to be damaged than pipe lines which extend along the floor of a mine.

In the embodiments of the invention illustrated in the drawings the piston of the common fluid motor for raising one of the supporting columns and for tightening the brake when the latter is in raised position is acted upon by fluid under pressure only on one side thereof. It is possible to substitute a differential piston for this type of piston. A differential piston would enable to raise and install the supporting device if acted upon by fluid under pressure on one side and to telescope the supporting device axially inwardly to shorten the length thereof to enable ready removal of the supporting device from its present location if acted upon by fluid under pressure on the opposite side thereof.

It is an important fact that the brake or clamping mechanism is operated by the force of reaction to the thrust exerted by the fluid motor. Therefore the brake is only firmly tightened at such time when the upper end of the supporting device engages the ceiling structure which is to be supported by it. It is possible to pre-bias the brake or clamping mechanism while one of the columns is being raised, but the ultimate and highest braking or clamping action is achieved only after the column has reached the highest position thereof. The degree of the aforementioned pre-bias depends upon the force acting upon rod 6 while the column is being raised tending to tighten the brake mechanism or to ram the radially inner wedge element 3 in axial direction into the radially outer wedge element 4.

In the structures of Figs. 1 to 6a either a liquid under pressure, or air under pressure, may be used for operating the prop-type supporting devices. If the devices are being operated hydraulically, the fluid under pressure is allowed to escape after use thereof into a storage vessel (not shown), and may be re-used an indefinite number of times for raising the supporting device. If the supporting device is being operated pneumatically, the air under pressure is simply dumped from the operating cylinder of the fluid motor. The same orifice may be used for admitting fluid to the operating cylinder and for draining, or dumping, fluid therefrom.

It will be understood from the foregoing that the parts 3 and 4 of the structure of Fig. 1 and the parts 16, 19 of the structure of Fig. 5 may be referred to either as a brake mechanism or as a wedge action locking means intended to lock both columns in position. The upper and the lower column remain in locked position precluding relative movement thereof even when the supply of fluid is disconnected from the support-operating fluid motor and the fluid under pressure contained therein has been drained off. In the structure of Fig. 1 the parts 7, 6, 3 and in the structure of Fig. 5 the parts 20, 21, 19 transmit the reaction to the column raising force to the brake mechanism or wedge action locking mechanism and the latter is set or tightened according to the maximum pressure exerted by the fluid motor upon the telescoping pair of columns.

It will be understood that, although but a few embodiments of this invention have been shown and described in detail, the invention is not limited thereto and that the illustrated embodiments may be modified or other embodiments made without departing from the spirit and scope of the invention as set forth in the accompanying claims.

It is claimed:

1. In a prop-type supporting device the combination of a pair of telescoping columns, fluid motor means for causing relative telescopic movement of said pair of columns to increase the spacing between opposite ends thereof, a wedge action brake mechanism adapted to preclude relative movement between said pair of columns, and operating means for said brake mechanism under the control of said fluid motor means adapted to set said brake mechanism according to the maximum pressure exerted by said fluid motor means upon said pair of columns, said operating means including an end member arranged adjacent the end of one of said pair of columns on the outside thereof in spaced relation therefrom and movable relative thereto, and said operating means further including a force-transmitting structure having one end positively connected to said end member and another end adapted to act upon said brake mechanism.

2. A prop-type supporting device comprising a first supporting column, a second supporting column longitudinally movable and relative to said first column, an end member arranged outside said first column adjacent the axially outer end thereof in spaced relation therefrom and movable relative thereto, fluid motor means operatively associated with said first column and said second column exerting pressure in opposite directions to cause relative movement between said first column and said second column, a brake mechanism for precluding relative movement between said first column and said second column, said brake mechanism including transversely movable brake surfaces and wedge action means arranged outside the fluid-receiving space of said fluid motor means and movable relative to said first column in a direction longitudinally thereof to cause transverse movement of said brake surfaces, and force-transmitting means responsive to opposite axial pressures exerted upon said end member and the end of said second column remote from said end member for acting upon said wedge action means in proportion to said pressures.

3. A prop-type supporting device comprising a first substantially tubular supporting column, a second substantially tubular supporting column adapted to telescope relative to said first column, an end member arranged outside said first column adjacent the axially outer end thereof in spaced relation therefrom and movable relative thereto, fluid motor means interposed between said first column and said second column exerting pressure in opposite directions upon said first column and said second column, a brake mechanism for precluding relative movement between said first column and said second column comprising transversely movable brake surfaces and wedge action means arranged outside the fluid-receiving space of said fluid motor means for causing transverse movement of said brake surfaces, a force-transmitting structure connected to said end member for transmitting pressure from said end member to said wedge action means to cause transverse movement of said brake surfaces upon relative axial movement between said end member and said first column, and yieldable spring means interposed between said wedge action means and said first column biasing said wedge action means to the non-operative position thereof.

4. A prop-type supporting device as specified in claim 3 wherein said force-transmitting structure includes a collapsible toggle mechanism.

5. A prop-type supporting device comprising a first substantially tubular supporting column having one end adapted to form a fluid motor piston, a second substantially tubular supporting column having one end adapted to form a fluid motor cylinder and receiving said one end of said first column, a substantially cap-shaped end member coaxially arranged outside said first column adjacent the axially outer end thereof in spaced relation therefrom and movable relative thereto, a brake mechanism for precluding relative movement between said first column and said second column comprising radially outwardly movable brake surfaces, a force-transmitting structure arranged inside said first column and said second column, said structure having one end projecting to the outside of said first column and engaging said end member and said structure having another end adapted to cause upon axial movement thereof relative to said first column radially outer movement of said brake surfaces, said structure further comprising a collapsible brake-releasing-means, a slide bearing for said structure formed by the upper end of said first column, and spring means interposed between said structure and said first column biasing said structure to the brake-releasing position thereof.

6. A prop-type supporting device comprising a first substantially tubular supporting column, a second substantially tubular supporting column coaxial to said first column adapted to telescope relative thereto, a substantially cap-shaped end member arranged outside said first column at the axially outer end thereof in spaced relation therefrom and movable relative thereto, fluid motor means interposed between said first column and said second column exerting pressure upon said first column and said second column to cause relative movement of said first column and said second column, a brake mechanism for precluding relative movement between said first column and said second column, said brake mechanism compirsing radially outwardly movable brake surfaces on said first column and a truncated cone movable relative to said first column in a direction longitudinally thereof adapted when so moved to cause radially outer movemnet of said brake surfaces, a force-transmitting structure arranged inside said first column and said second column, said structure having one end projecting to the outside of said first column and engaging said end member and said truncated cone forming an integral part of the other end of said structure, said structure further comprising a collapsible brake-release means, a slide bearing for said structure formed by the upper end of said first column, and spring means interposed between said truncated cone and said first column biasing said truncated cone to the brake-releasing position thereof.

7. A prop-type supporting device comprising a lower supporting column, an upper supporting column movable parallel and relative to said lower column, an end member arranged outside said lower column adjacent the axially outer end thereof in spaced relation therefrom and movable relative thereto, fluid motor means interposed between said lower column and said upper column to cause relative movement between said lower column and said upper column, a brake mechanism for precluding relative movement between said lower column and said upper column, said brake mechanism including transversely movable brake surfaces and wedge action means arranged outside the fluid-receiving space of said fluid motor means movable relative to said lower column in a direction longitudinally thereof to cause transverse movement of said brake surfaces, and force-transmitting means responsive to opposite pressures exerted upon said end member and the end of said upper column remote from said end member for acting upon said wedge action means in proportion to said pressures.

References Cited in the file of this patent

UNITED STATES PATENTS

| | | |
|---|---|---|
| 2,160,454 | Bucky | May 30, 1939 |
| 2,364,715 | Horton et al. | Dec. 12, 1944 |
| 2,379,989 | Rappl et al. | July 10, 1945 |
| 2,676,571 | Parsons | Apr. 27, 1954 |

FOREIGN PATENTS

| | | |
|---|---|---|
| 507,997 | Belgium | Jan. 15, 1952 |
| 811,106 | Germany | Aug. 16, 1951 |
| 831,834 | Germany | Feb. 18, 1952 |
| 813,541 | Germany | Sept. 13, 1951 |
| 864,538 | Germany | Jan. 26, 1953 |
| 958,578 | France | Sept. 19, 1949 |